US008567170B2

(12) United States Patent
Andros et al.

(10) Patent No.: US 8,567,170 B2
(45) Date of Patent: Oct. 29, 2013

(54) DEVICE AND METHOD FOR CREATING A PLANTING ROPE FROM PLANT ROOT MATERIAL

(75) Inventors: Matthew James Andros, Santa Margarita, CA (US); Garett John Stapp, San Luis Obispo, CA (US); Thomas Klippenstein, Los Osos, CA (US)

(73) Assignee: Plant Sciences, Inc., Watsonville, CA (US)

( * ) Notice: Subject to any disclaimer, the term of this patent is extended or adjusted under 35 U.S.C. 154(b) by 0 days.

(21) Appl. No.: 13/419,393

(22) Filed: Mar. 13, 2012

(65) Prior Publication Data

US 2012/0255265 A1 Oct. 11, 2012

Related U.S. Application Data

(60) Provisional application No. 61/472,590, filed on Apr. 6, 2011.

(51) Int. Cl.
*D02G 3/36* (2006.01)

(52) U.S. Cl.
USPC .................................................. 57/10; 57/13

(58) Field of Classification Search
USPC .................. 57/3, 6, 10, 13, 210, 230
See application file for complete search history.

(56) References Cited

U.S. PATENT DOCUMENTS

| 47,343 | A | * | 4/1865 | Sperry | 57/13 |
|---|---|---|---|---|---|
| 634,050 | A | | 10/1899 | Wittbold | |
| 2,248,123 | A | * | 7/1941 | Sackner | 57/7 |
| 2,856,845 | A | * | 10/1958 | Beyette | 100/13 |
| 2,974,457 | A | * | 3/1961 | Saxton | 100/13 |
| 3,221,875 | A | * | 12/1965 | Paquette | 342/12 |
| 3,416,434 | A | * | 12/1968 | Woserau et al. | 100/144 |
| 3,445,985 | A | * | 5/1969 | Manetta | 53/530 |
| 3,473,291 | A | * | 10/1969 | Raymond et al. | 53/530 |
| 3,478,506 | A | | 11/1969 | Kawashima | |
| 3,507,137 | A | * | 4/1970 | Robinson et al. | 72/148 |
| 3,559,390 | A | * | 2/1971 | Staschewski | 57/6 |
| 3,727,390 | A | * | 4/1973 | Schwarz | 57/13 |
| 3,934,395 | A | * | 1/1976 | Vryland | 57/13 |
| 4,277,885 | A | * | 7/1981 | Scudder | 29/780 |
| 4,461,429 | A | * | 7/1984 | Goekler et al. | 242/439.5 |
| 4,463,547 | A | * | 8/1984 | Young | 57/6 |
| 5,330,608 | A | * | 7/1994 | Kemmler et al. | 156/361 |
| 5,421,140 | A | * | 6/1995 | Theriault | 53/530 |
| 5,487,941 | A | | 1/1996 | Pepin | |
| 5,979,288 | A | | 11/1999 | Gallagher et al. | |
| 6,123,654 | A | * | 9/2000 | LaFleur | 493/217 |
| 6,260,342 | B1 | * | 7/2001 | Lehman | 57/3 |

(Continued)

FOREIGN PATENT DOCUMENTS

EP 0958426 B1 7/1997

*Primary Examiner* — Shaun R Hurley
(74) *Attorney, Agent, or Firm* — R. Scott Kimsey, Esq.; Klein, DeNatale, Goldner

(57) ABSTRACT

A device for producing a root rope includes a transport path for suspending a carrier line thereabove, root material being deposited on the carrier line. A winding apparatus receives the carrier line and also receives at least one wrapping material. The winding apparatus uses a winding motion to wrap the wrapping material around the root material and carrier line, securing the root material to the carrier line and creating the "root rope." A reel receives the root rope from the winding apparatus, the reel using a rotating motion to wrap the root rope around the reel.

3 Claims, 15 Drawing Sheets

(56) References Cited

U.S. PATENT DOCUMENTS

| | | | |
|---|---|---|---|
| 6,490,852 B1 * | 12/2002 | Mustacich et al. | 57/3 |
| 6,519,924 B1 * | 2/2003 | Barz | 57/18 |
| 6,789,380 B2 * | 9/2004 | Mellott et al. | 57/10 |
| 6,945,026 B1 * | 9/2005 | Hanna | 57/3 |
| 7,520,120 B2 * | 4/2009 | Saito et al. | 57/10 |
| 7,571,594 B2 * | 8/2009 | Pascoe et al. | 57/6 |
| 7,934,366 B2 * | 5/2011 | Dye et al. | 57/6 |
| 2003/0074878 A1 * | 4/2003 | Mellott | 57/10 |
| 2006/0107644 A1 * | 5/2006 | Dye et al. | 57/13 |
| 2008/0022650 A1 * | 1/2008 | Pascoe et al. | 57/6 |
| 2009/0272570 A1 * | 11/2009 | Chen | 174/350 |

\* cited by examiner

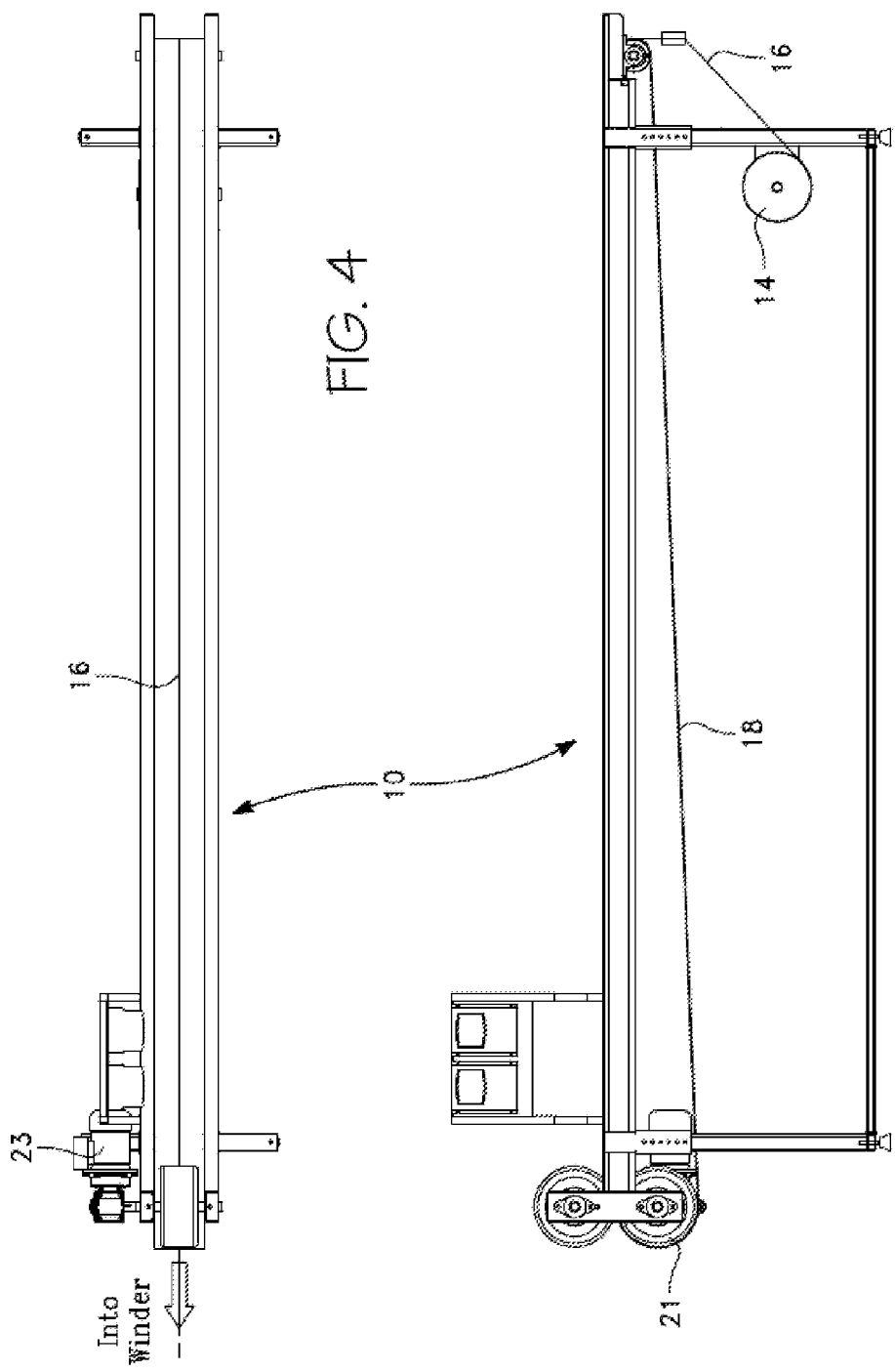

DEVICE AND METHOD FOR CREATING A PLANTING ROPE FROM PLANT ROOT MATERIAL

RELATED APPLICATIONS

This Application claims priority of U.S. Provisional Patent Application No. 61/472,590, filed on Apr. 6, 2011, and entitled "Method and Apparatus for Planting Raspberries, Blackberries, and other plants in the *Rubus* Genus," which is incorporated herein by reference in its entirety.

BACKGROUND OF THE INVENTION

The present invention relates generally to a method of planting, and more specifically to a method of planting root material from suckering or runner-producing plants, for example, plants of the genus *Rubus*.

The disclosed method and apparatus relates generally to the planting of raspberry, blackberry and other species and hybrids in the *Rubus* genus, as well as asparagus, strawberries, or other suitable plants, and more specifically to methods of planting suckering plants, or plants producing runners, where the plant develops from planting of root material, as opposed to seeds, whole plants, or other planting methods. While the present invention has application to other species and hybrids, particularly in the *Rubus* genus, but among other suckering plants, as well as those producing runners, because of the broad application of the present application to raspberries in particular, the term "raspberries" will be used in this disclosure with the understanding that the claimed method and apparatus are applicable to those other plants, species and hybrids, notwithstanding the specific reference to raspberries.

Raspberries are a small-fruit crop produced by large and small scale farming operations. Initial investment for raspberry farming is high, primarily a result of the costs associated with land preparation, planting, and installation of trellis and irrigation systems. Raspberry cultivars readily produce new shoots from the roots, in a planting process called "suckering." New plantings are established by taking advantage of the plants' ability to produce these suckers. As the plants go dormant in the fall they are harvested and the harvested roots are used to produce subsequent plantings. Future planting can be established using the roots only or by using a complete plant consisting of the roots, the crown and a portion of a stem. In either style of planting, (root only or root, crown & stem), large amounts of hand labor are expended to sort, clean, package, warehouse and replant the root material. Of these, the planting process consumes the largest amount of labor.

The current state of the art for replanting raspberry roots consists of the following operations: (1) preparing the harvested crop for cold storage; (2) cleaning, sorting and packaging; and (3) prior to planting, preparing the fields to receive the roots. This last step involves multiple operations using specialized ground-working equipment to create a defined bed top with longitudinal grooves in the surface of the bedtop. These grooves are designed to receive the root plantings.

Once the bed has been prepared, the plants are removed from cold storage and transported to the field immediately prior to planting. The roots are unpacked and weighed into totes that are then placed along the bed top at spacings which will yield the desired plant density. Laborers then separate the bunches of roots and lay them by hand into the grooves atop the bed. Finally, specialized ground-working equipment is used to cover the roots with an even layer of soil. It should be mentioned that the previously described process is more art than science. Many variables can affect the quality and success of the finished plantings, such as soil and weather conditions, and the availability of skilled laborers to perform the planting and tractor work. A few acres planted in this fashion create a stressful fast paced operation that must be overseen by a skilled supervisor to insure that the work is done correctly. Large plantings of 100 acres or greater are even more problematic and are labor intensive undertakings. Management, logistical and labor costs are extremely high, cumulatively requiring 100+ man-hours per acre planted.

SUMMARY OF THE INVENTION

One aspect of the present invention provides a device for producing a root rope. The device includes a carrier line suspended above a transport path for suspending a carrier line thereabove, and on which root material is deposited. A winding apparatus receives the carrier line and also receives at least one wrapping material. The winding apparatus uses a winding motion to wrap the wrapping material around the root material and carrier line, securing the root material to the carrier line and creating the "root rope." A reel receives the root rope from the winding apparatus, the reel using a rotating motion to wrap the root rope around the reel.

In another aspect of the invention, the winding apparatus is a rotating drum that includes a funnel adapted to receive the carrier line and wrapping material, the rotation of the rotating drum causing the wrapping material in the funnel to wrap around the root material and carrier line to create the root rope.

In another aspect of the invention, the funnel includes two openings, one having a larger diameter than the other. The carrier line and root material is received into the larger opening of the funnel, while the root rope is dispensed from the smaller opening of the funnel.

In another aspect of the invention, the device also includes a drive wheel assembly that engages the winding apparatus, a rotating motion of the drive wheel assembly translating to rotation of the winding apparatus.

In still another aspect of the invention, the device includes a drive wheel assembly engaging a rotating drum, a rotating motion of the drive wheel assembly translating to rotation of rotating drum.

In another aspect of the invention, the device further includes a conveyor that defines a transport path for transporting root material along a transport path. The carrier line is suspended above the conveyor.

In another aspect of the invention, the device further includes at least one pulley in communication with the exit of the funnel. The pulley is adapted to receive the completed root rope from the funnel.

In another aspect of the invention, the pulley is in electronic communication with a controller, the controller adapted to regulate the speed of the reel.

BRIEF DESCRIPTION OF THE DRAWINGS

FIG. 4 shows a top view of the conveyor shown in FIG. 4.

FIG. 5 shows a side view of the conveyor shown in FIG. 4.

DETAILED DESCRIPTION OF THE INVENTION

Figure 1:
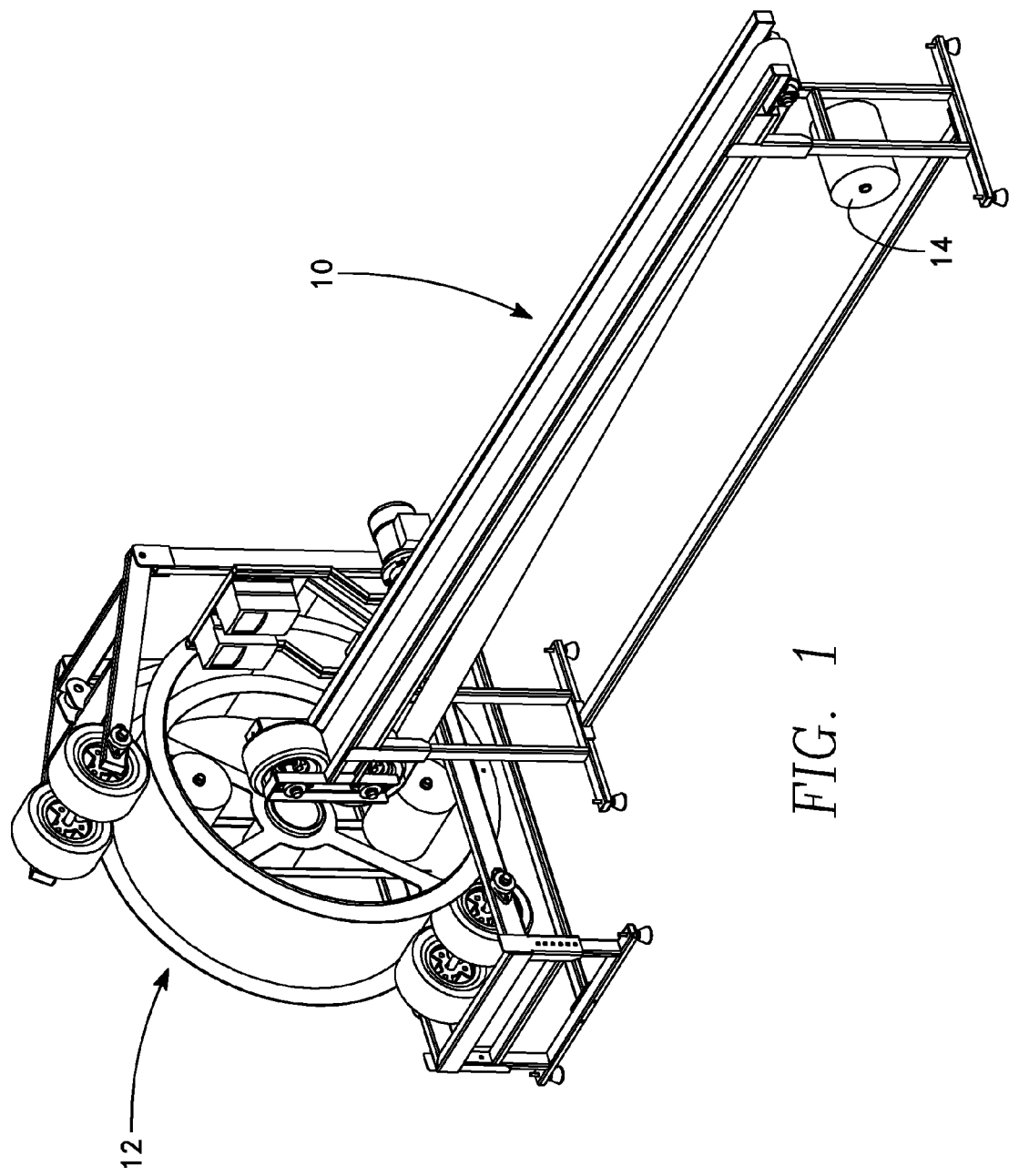
FIG. 1 shows a perspective view of one embodiment of a conveyor and winding apparatus of the present invention.

Embodiments of the presently disclosed method and apparatus reduce costs and time associated with the preparation of plant beds and planting raspberry plants or other plants producing suckers, runners, and the like. The planting methodologies developed through use of this invention have application across the full spectrum of plant and fruit production, including commercial growers, nursery operations, and retail or wholesale outlets which sell plants to the hobby farm and the gardening/home improvement market. While the discussion below refers specifically to raspberries, it is contemplated that the principles of the present invention are applicable to any suitable plant.

Due to the fibrous nature of raspberry roots it is possible to weave the roots into a "rope" configuration, where the roots are preferably disposed onto a carrier line. The carrier line and attached roots are fed through a winding apparatus which wraps one or more wrapping members around the roots/carrier line, to form the rope configuration. The carrier line and wrapping member(s) are preferably fabricated from organic materials, (e.g., sisal, jute and bamboo) which will breakdown quickly once placed in the microbial soil environment so as not to impede the harvest process later in the season.

The roping machine apparatus utilized in the present invention includes a feed conveyor, a winding apparatus for winding wrapping material around the roots, and a reeling apparatus for winding the root rope onto a reel. The feed conveyor and winding apparatus may be synchronized together such that the conveyor and winding apparatus are in operation at the same time. The reeling apparatus takes up root rope as it is dispensed from the winding apparatus, with slight tension maintained on the root rope. Root rope is guided onto the reel for uniform distribution on the reel. Once wound on a reel, the root rope is placed into cold storage until ready to be planted.

The feed conveyor will typically be placed alongside a work surface containing root material, either fresh from the field, or taken from cold storage. The carrier line is preferably axially disposed above the feed conveyor, such that workers may manually place root material on the carrier line as it passes along above the conveyor. An acceptable size for the feed conveyor is six inches wide and twelve feet long, which allows provides sufficient space for workers to attach root material to the carrier line. Although in the embodiments of the invention described herein the root material is preferably hand-disposed onto a carrier line, it is contemplated that automated methods of disposing the root material onto the carrier line may be utilized. Further, in some embodiments of the invention, the carrier line may be omitted, with the root material being contained within the wrapping material without first being disposed onto a carrier.

The carrier line and attached root material are fed into the winding apparatus. As the carrier line and the root material attached to the carrier line are fed through the winding apparatus, wrapping material (the "wrapping twine") is wrapped around the carrier line and root material to secure the root material, forming the root rope. One embodiment of the winding apparatus includes a winding drum having a center axial opening, a support frame, rotation means, a wrapping material source for providing the wrapping material, and rotation means for rotating the winding drum. The root rope is axially dispensed from the winding apparatus and spooled onto a reel attached to the reeling apparatus, with the root rope guided onto the reel. Full reels are transported to cold storage, where the root rope is stored until required for planting.

When required for planting, the rope storage reels are attached to bedshaping equipment modified to accept the rope storage reels. The rope is fed into the bed by being spooled off of the storage reel, and guided into the proper bed location by an adjustable injection tool. Correct density and correct plant location are controlled respectively by using the proper root mass density during the roping process, and proper placement of the rope during the bedshaping process. At harvest, the root from the plants are reclaimed and the process repeated.

In utilizing the method disclosed herein, substantial savings will be realized from the reduction in the size of the planting crew. The utilization of the root rope eliminates the manual labor steps of sorting, separating, and planting the root material.

Figure 2:
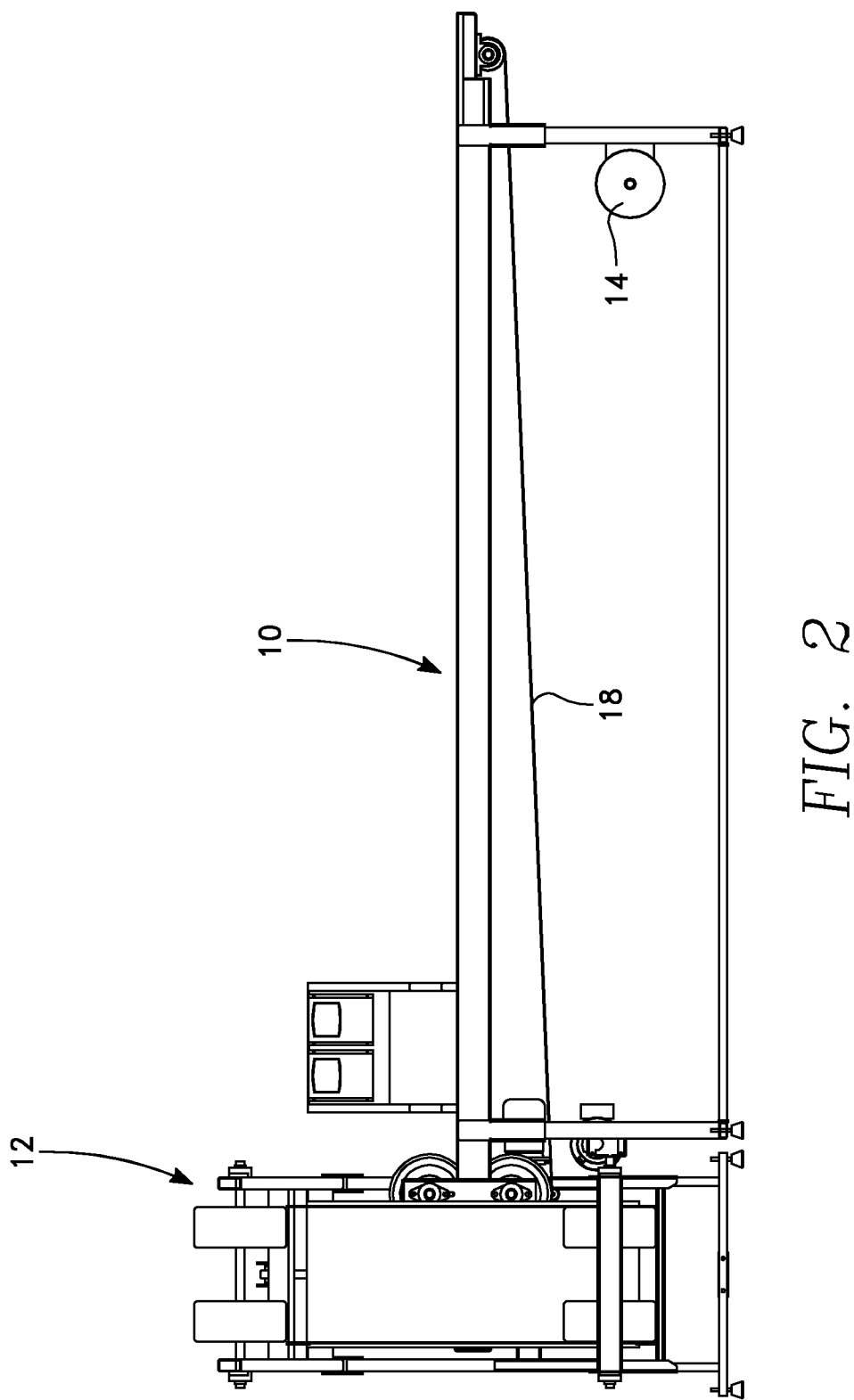
FIG. 2 shows a side view of the conveyor and winding apparatus shown in FIG. 1.
Figure 3:
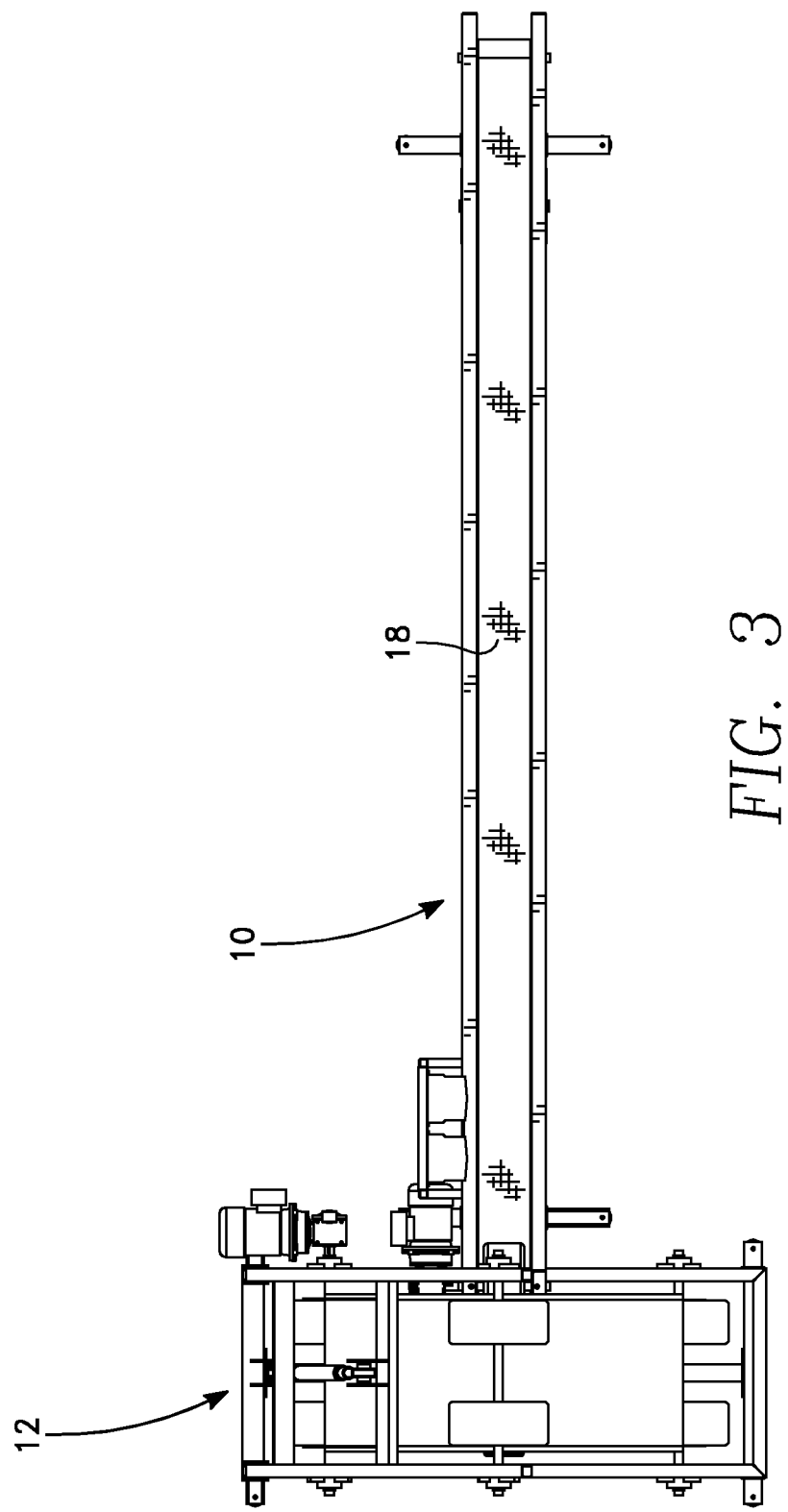
FIG. 3 shows a top view of the conveyor and winding apparatus shown in FIG. 1.

FIGS. 1 through 19 depict exemplary embodiments of the present invention, or of various components thereof. FIGS. 1 through 5 depict an embodiment of a feed conveyor 10 which feeds into winding apparatus 12 in some embodiments of the present invention. FIG. 1, for example, shows a perspective view of one embodiment of a conveyor and winding apparatus of the present invention. A carrier line supply, such as spool 14 may provide carrier line 16 (not shown), which is preferably suspended above a transport path defined by continuous belt 18. Root material is preferably hand placed on carrier line 16, and the combination of root material and carrier line 16 is fed into the winding apparatus 12. FIG. 2 illustrates a side view of the conveyor 10 and winding apparatus 12 of FIG. 1. FIG. 3 provides a top view of the same, while FIG. 4 provides a bottom view of conveyor 10, alone. FIG. 5 is a side view of conveyor 10.

As best shown in FIGS. 2 and 5, feed conveyor 10 comprises a continuous belt 18 which extends between idler roller 19 and is powered by a drive roller 21, which is driven by a motor 23. A work surface, such as a table, counter, or the like (not shown), is preferably disposed adjacent to feed conveyor 10, where root material is placed on the work surface for easy access by workers, who deposit the root material onto the carrier line 16.

Figure 6:
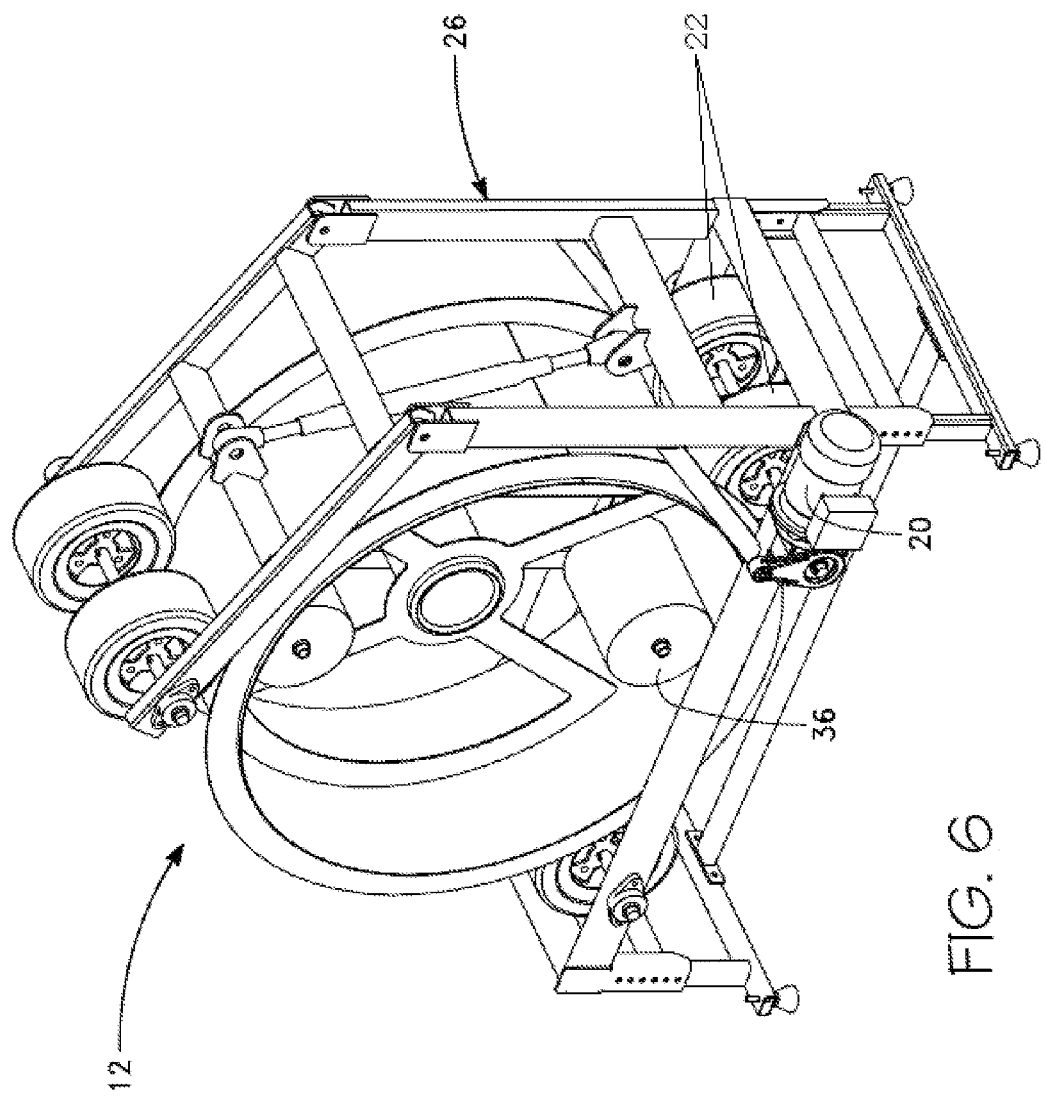
FIG. 6 shows a perspective view of one embodiment of a winding apparatus of the present invention, viewed from the side into which the carrier line and attached root material are fed into the apparatus (henceforth, the "front").
Figure 7:
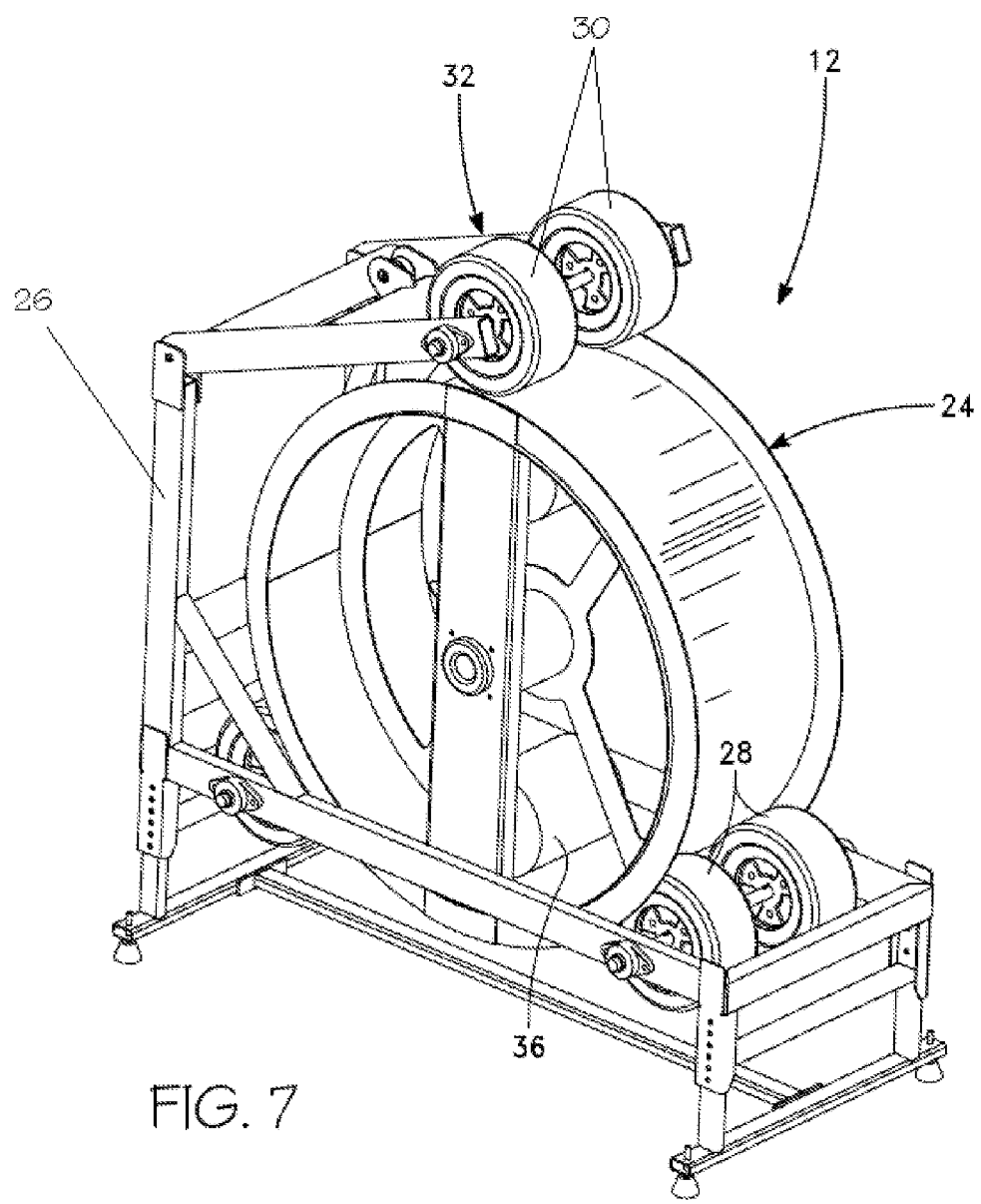
FIG. 7 shows a perspective view of one embodiment of a winding apparatus, viewed from the side from which completed root rope is dispensed (henceforth, the "rear").

Exemplary embodiments of winding apparatus 12 are shown in greater detail in FIGS. 6 through 10. As shown in FIG. 6, winding apparatus 12 preferably includes a drive motor 20 which is mechanically linked to a drive wheel assembly 22. Drive wheel assembly 22 rotates drum 24, which is cradled within frame 26. As seen in FIG. 7, frame 26 comprises lower idler wheel assembly 28 and upper idler wheel assembly 30, both which retain and guide drive wheel assembly 22 within frame 26. Lower idler wheel assembly 28 may be located on the opposite side of frame 26 from drive wheel assembly 22. Upper idler wheel assembly 30 may be disposed on a pivoting arm assembly 32 which is biased downwardly by tension member 34. Winding apparatus 12 further preferably includes wrapping material spools 36 which provide wrapping material to the root rope as the drum 24 is rotated.

Figure 8:
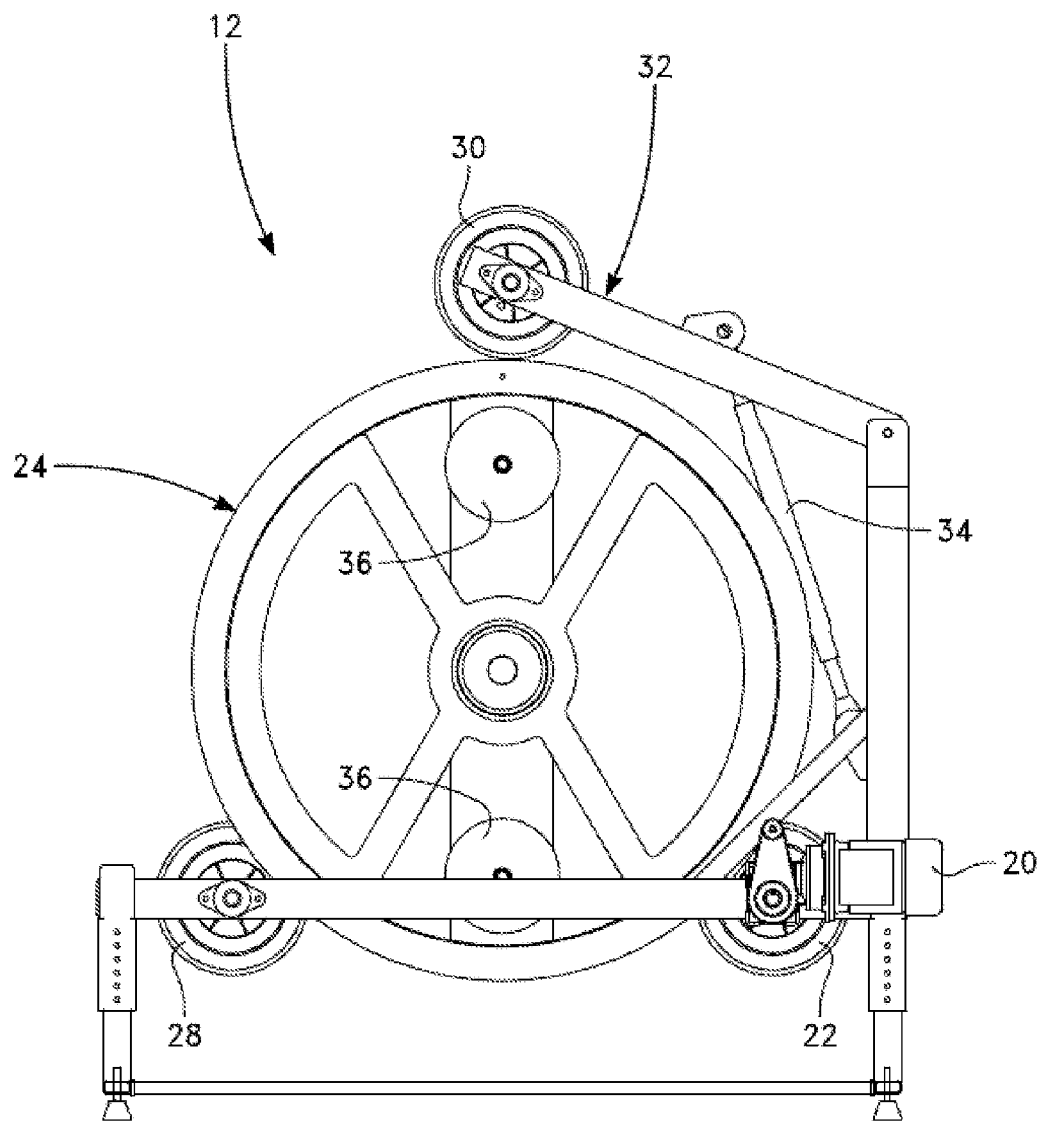
FIG. 8 shows a front view of one embodiment of a winding apparatus of the present invention.
Figure 9:
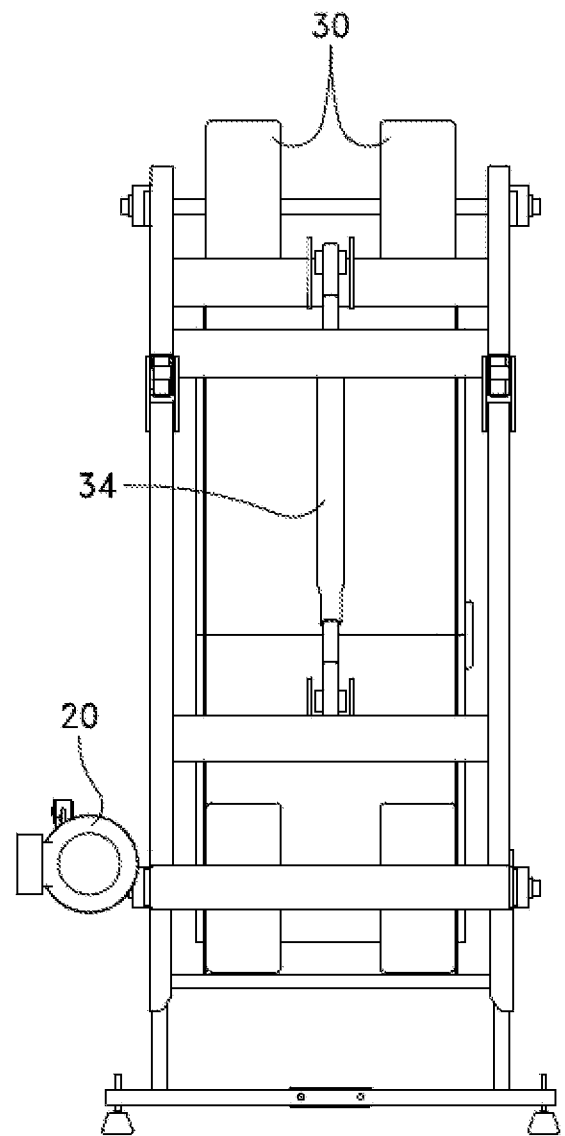
FIG. 9 shows a side view of one embodiment of a winding apparatus of the present invention.

FIG. 8 shows a side view of winding apparatus 12, and the relative positions of upper idler wheel assembly 30, lower idler wheel assembly 28, and drive wheel assembly 22 in this embodiment of the invention are clearly shown. It should be noted, however, that any suitable means of rotating drum 24 may be employed. FIG. 9 provides a side view of the same embodiment of winding apparatus 12 shown in FIG. 8.

Figure 10:
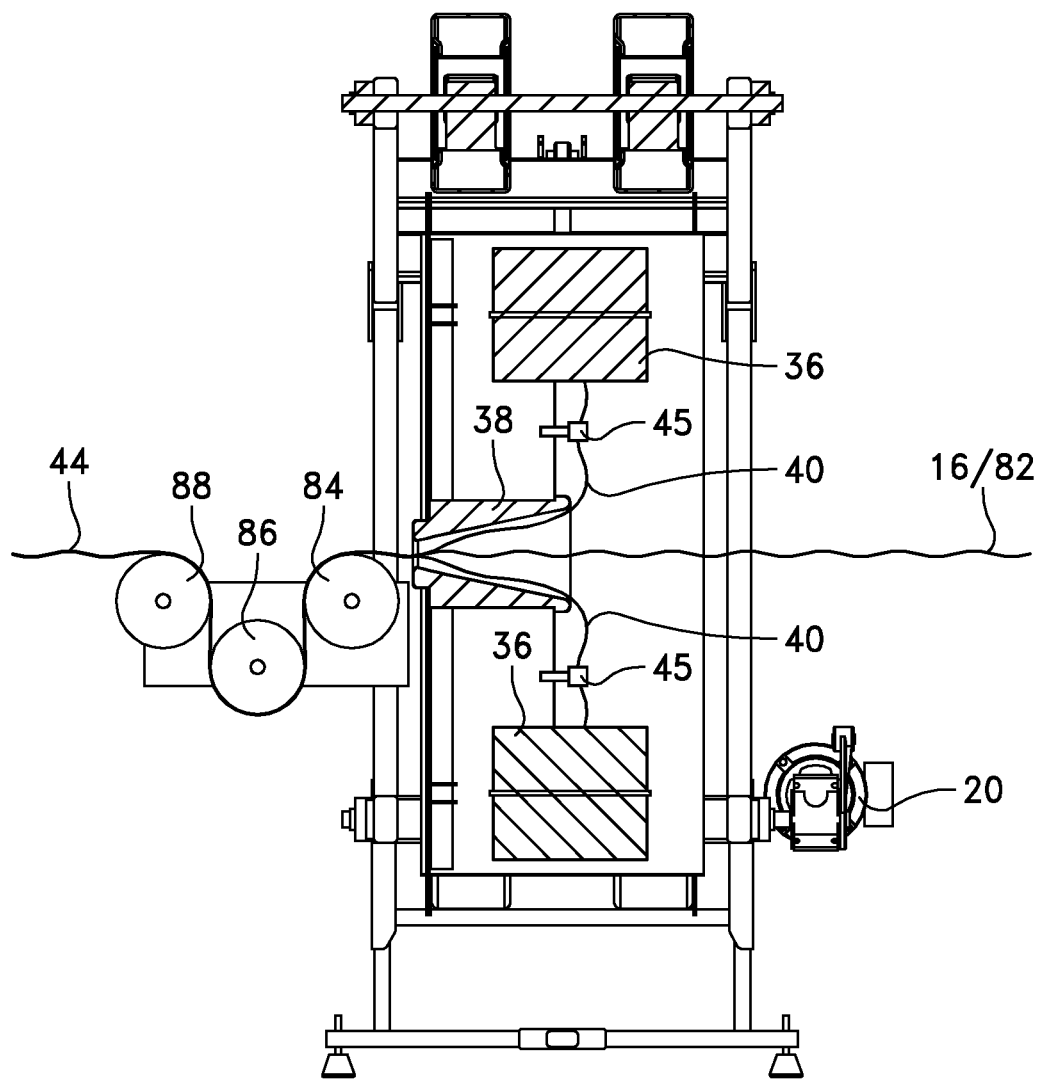
FIG. 10 shows a sectional view of one embodiment of a winding apparatus of the present invention.
Figure 11:
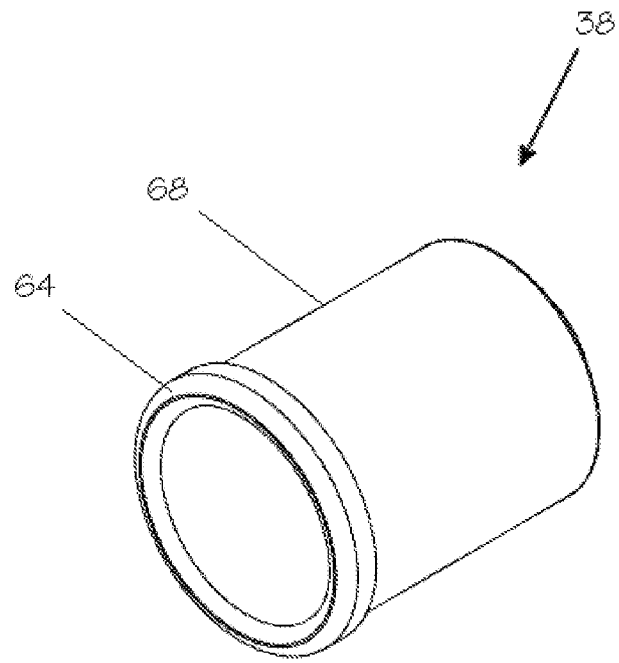
FIG. 11 shows a front perspective view of one embodiment of a funnel that is utilized in one embodiment of the winding apparatus of the present invention.
Figure 12:
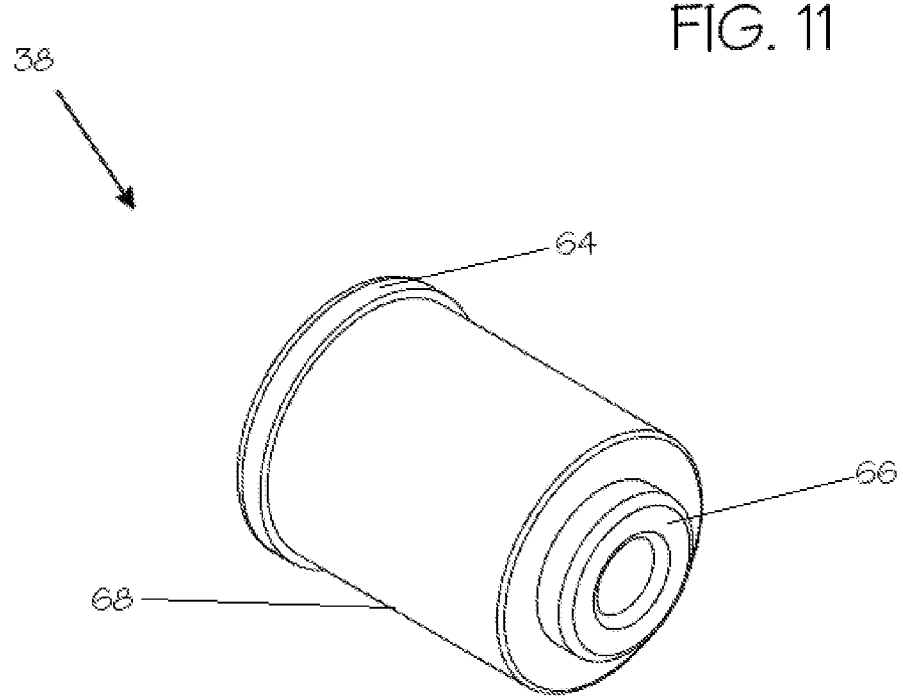
FIG. 12 shows a rear perspective view of an embodiment of a funnel that is utilized in an embodiment of the winding apparatus.
Figure 13:
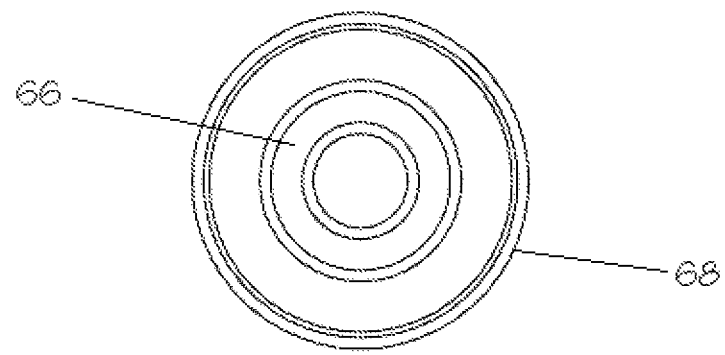
FIG. 13 is a front view of the funnel depicted in FIG. 11.
Figure 14:
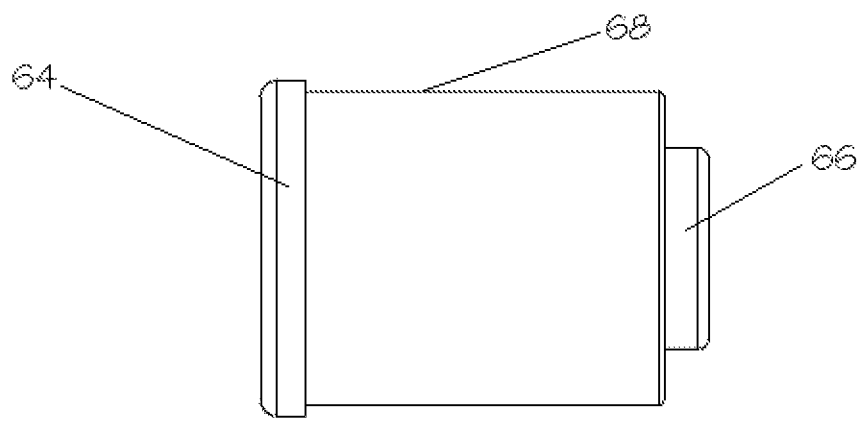
FIG. 14 is a side view of the funnel depicted in FIG. 11.
Figure 15:
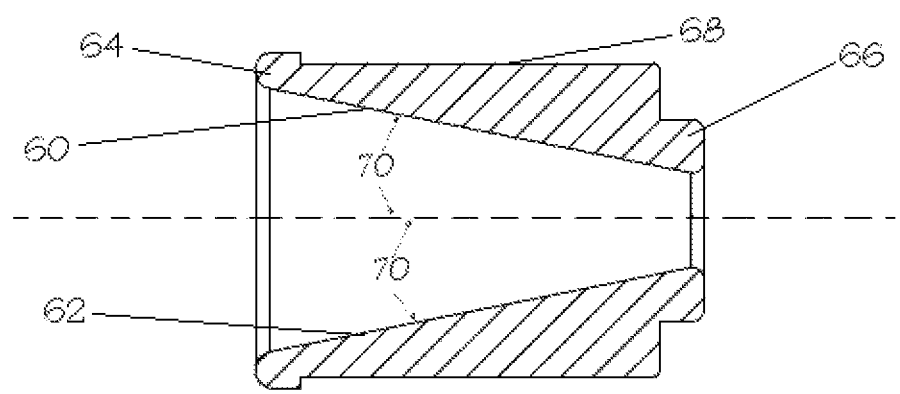
FIG. 15 is a sectional view of the funnel shown in FIG. 11.

As shown in FIG. 10, drum 24 preferably comprises a funnel member 38, into which the combination of root material and carrier line 16 are drawn, entering the larger diameter opening. As root material 82 and carrier line 16 are drawn into funnel member 38, wrapping material 40 (not shown) is applied by rotation of drum 24. Wrapping material 40 is preferably in the form of two strands of material wound onto or around the root material 82 and carrier line 16 from opposing directions. The wrapping material 40 preferably passes through tension eyelets 45, which guide the wrapping material 40 and maintain the required tension in the wrapping material. Finished root rope 44 is dispensed from the smaller diameter opening of funnel member 38 as shown in FIG. 14. Wrapping material 40 is preferably spooled off of wrapping spine spools 36 as the drum 24 rotates. Tension of the completed root rope 44 is preferably regulated as the rope emerges from funnel 38. Root rope 44 preferably passes through a series of pulleys 84, 86, and 88, that serve to regulate the tension of root rope 40 and to provide feedback to reel 52 if the tension is too great or not great enough. Pulley 86 is preferably the load cell that measures the tension on root rope 44. Feedback is provided to a motor controller that adjusts the rotational speed of reel 52 based on the measured tension of root rope 44. If the tension of root rope 44 is too low, the rate of rotation of reel 52 is increased. Conversely, if the measured tension of root rope 44 is too high, the rate of rotation of reel 52 decreases.

While it is preferred that pulleys 84, 86, and 88 are used to measure, regulate, and adjust the tension of root rope 44, it is contemplated that the present device may be utilized without these pulleys. A user of the present device may seek to maintain a more or less constant tension of root rope 44 solely through a set rotational speed of reel 52, and when tension has to be adjusted the user may, for example, adjust the rotational speed of reel 52 based on manual observation of root rope 44 as it leaves funnel 38.

FIGS. 11 through 15 show an exemplary embodiment of a funnel member.

Example

Funnel Member

An exemplary embodiment of funnel member 38 of the present invention is now described. It is to be understood that the dimensions of exemplary funnel member 38 provided here are exemplary and provided for purposes of illustration, and should not be considered limiting. Any suitable size of shape of funnel member 38 may be used.

An exemplary funnel member 38, as shown in FIGS. 11 through 15, includes a generally cylindrical body 68 that is about eight inches in length. Flanges 64 and 66 of about one inch in width each are provided at either end of funnel member 38. Thus, the overall length of exemplary funnel member 38 is about ten inches. Openings are defined at either end of the funnel member 38. At one end, a smaller opening is defined, preferably being about one inch in diameter. At the other end of funnel member 38, a larger opening is defined, the larger opening preferably being about six inches in diameter. Interior walls 60 and 62, shown in FIG. 15, extend between the smaller opening and the larger opening, the interior walls preferably slanting at about an 11.3° angle 70 from an imaginary longitudinal axis 72 drawn through the center of funnel member 38 and extending across the length thereof. Flange 64 at the end of funnel member 38 having the larger opening preferably extends slightly beyond body 68, giving that end of funnel member 38 an overall diameter of about seven and a half inches. Flange 66 at the end of funnel member 38 having the smaller opening is preferably set in from the edges of body 68, giving that end of funnel member 38 a diameter of about four and a half inches. It is contemplated that the dimensions provided herein apply to one exemplary embodiment of funnel member 38, and that any suitable size or shape of funnel member 38 may be used without departing from the spirit or scope of the present invention.

Figure 16:
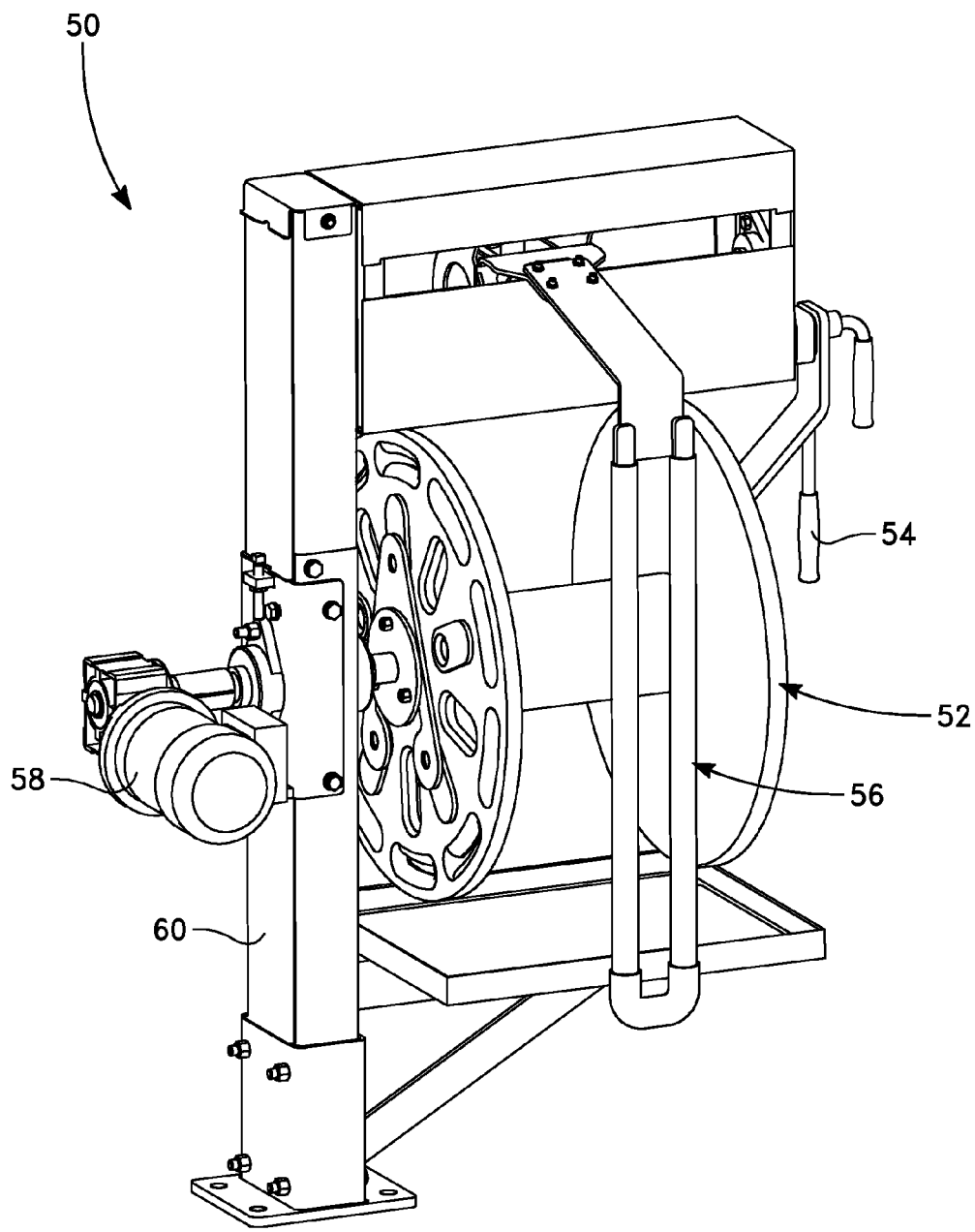
FIG. 16 shows one embodiment of a reeling apparatus of the present invention which may be utilized with the present invention, the reeling apparatus including a guide assembly.
Figure 17:
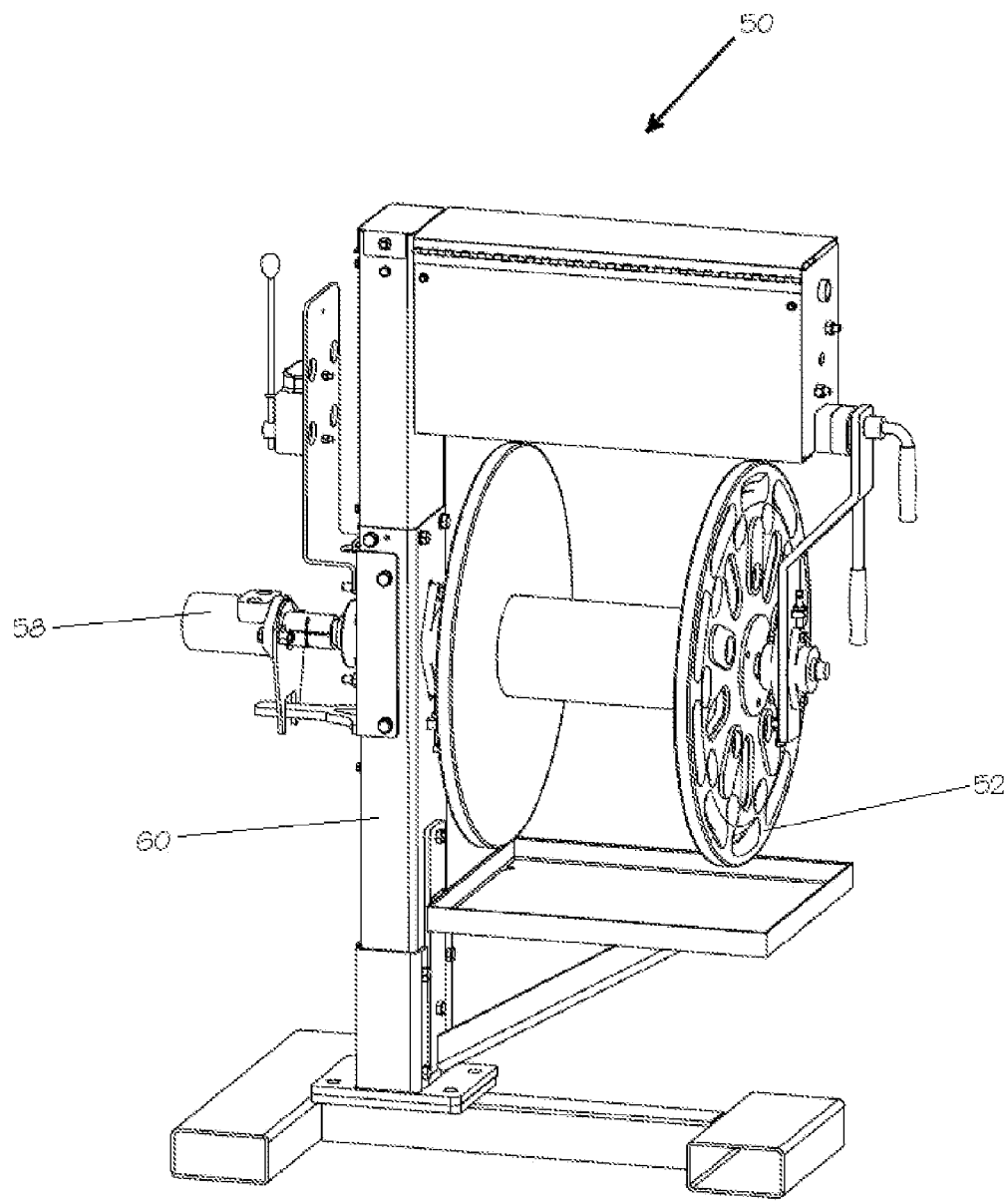
FIG. 17 shows an alternative embodiment of a reeling apparatus of the present invention.

Once the finished root rope 44 is dispensed from the winding apparatus 12, it is preferably pulled by a reeling apparatus 50. Exemplary embodiments of a reeling apparatus are depicted in FIGS. 16 and 17. Reeling apparatus 50 preferably includes a reel 52 which is suspended between a locking arm 54 and a support column 60. The reeling apparatus 50 comprises a motor 58 (either electric or hydraulic) which rotates reel 52 to take up finished root rope 44 (not shown) dispensed from the winding apparatus 12. A slight tension is maintained on the finished root rope. Some embodiments of reeling apparatus 50 comprise a guide assembly 56 which guides finished root rope 44 onto the reel 52 by laterally traversing back and forth along the axial length of the reel such that the rope is evenly wound across the width of the reel. An exemplary embodiment of a reeling apparatus 50 having a guide assembly 56 is shown in FIG. 16.

Figure 18:
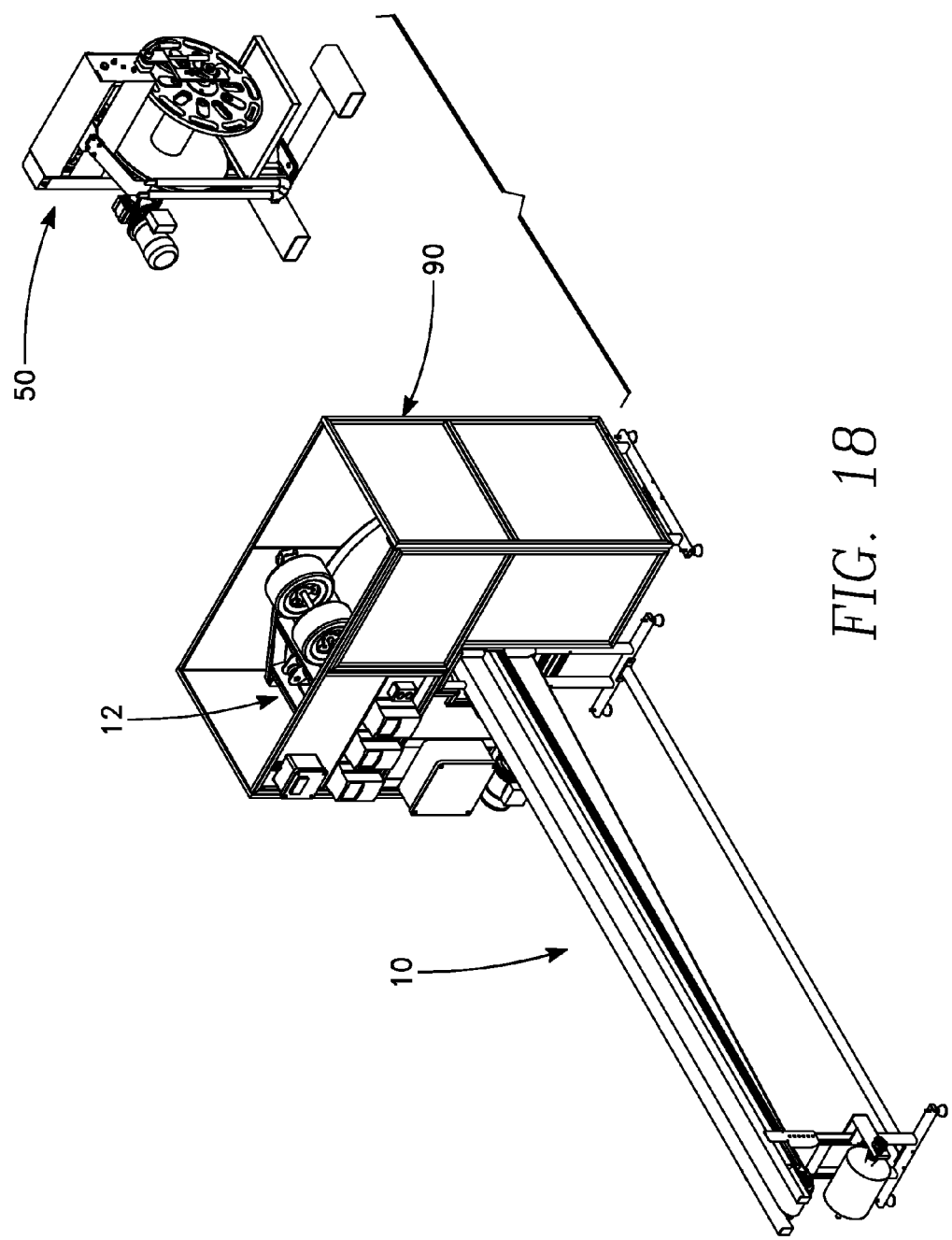
FIG. 18 shows the relative disposition of a conveyor, winding apparatus, and reeling apparatus in one embodiment of the present invention.

FIG. 18 depicts the relative disposition of components of an exemplary root rope assembly and reeling system of the present invention. As shown in the figure, conveyor 10 is preferably located in proximity to winding apparatus 12, which winds the wrapping material around the root material and carrier line to form a completed root rope. Reeling apparatus 50 is preferably further removed from conveyor 10 and winding apparatus 12 and maintains a constant tension on the finished root rope as it is being reeled. It is contemplated, however, that any suitable disposition of the various components of the present invention may be employed. FIG. 18 also shows an exemplary shield 90 that may be associated with some embodiments of the present invention. Shield 90 encloses a space around winding apparatus 12, ensuring that the space is kept free of debris and also preventing harm to workers and others in the vicinity of winding apparatus 12 who may be harmed by the rotational movement thereof.

Figure 19:
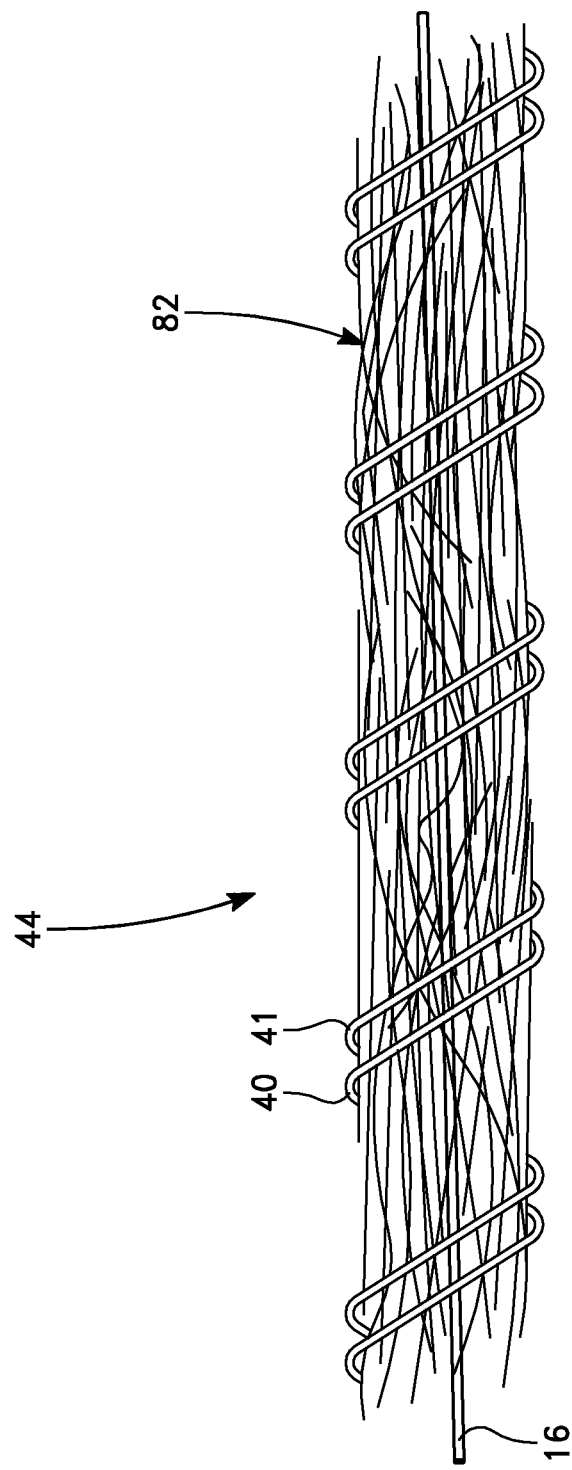
FIG. 19 shows one embodiment of a root rope constructed in accordance with the teachings of the present invention.

FIG. 19 shows an exemplary embodiment of a root rope 44 constructed in accordance with the teachings of the present invention. The root rope includes a carrier line 16 and root material 82 disposed along carrier line 16. At least one wrapping line or length of wrapping material 40 is also included. A second wrapping material 41 is also preferably provided, though it is contemplated that a single wrapping material, or more than two wrapping materials, may be used so long as root material 82 is secured to carrier line 16.

Carrier line 16 and wrapping materials 40 and 41 are preferably produced from organic materials such as jute, sisal, bamboo, or combinations of these. It should be noted that the first wrapping material 40 and the second wrapping material 41 may be composed of the same material. The use of two element numbers herein to refer to two separate lengths of wrapping material does not necessarily indicate different composition, though wrapping materials of differing composition may be used if desired.

While the above is a description of various embodiments of the present invention, further modifications may be employed without departing from the spirit and scope of the present invention. It is contemplated that such modifications will be readily apparent to those of ordinary skill in the art upon reading this disclosure. Thus the scope of the invention should not be limited according to these factors, but according to the claims to be filed in the forthcoming utility application.

Having thus described the preferred embodiment of the invention, what is claimed as new and desired to be protected by Letters Patent includes the following:

1. A device for producing a root rope from plant root material, the device comprising:
    a transport path for suspending a carrier line thereabove, the carrier line for depositing root material thereon;
    a rotating drum comprising a funnel adapted to receive the carrier line, the funnel further adapted to receive at least one wrapping material from a wrapping material source, wherein rotation of the drum causes the wrapping material to be wound about the carrier line, securing the root material to the carrier line to produce a root rope; and
    a reel positioned to receive the root rope from the winding apparatus, the reel rotating to wrap the root rope around a surface thereof,
    wherein the funnel comprises a first opening and a second opening, the first opening having a larger diameter than the second opening, and wherein the carrier line is received into the larger opening of the funnel and the root rope is dispensed to the reel from the smaller opening of the funnel.

2. A device for producing a root rope from plant root material, the device comprising:
    a rotating drum comprising a funnel adapted to receive a carrier line having root material disposed thereon, the rotating drum further receiving at least one wrapping material into the funnel thereof from a wrapping material source, the rotating drum rotating such that the wrapping material winds around the carrier line and root material, securing the root material to the carrier line to product a root rope,
    wherein the funnel comprises a first opening and a second opening, the first opening having a larger diameter than the second opening, and wherein the carrier line is received into the larger opening of the funnel and the root rope is dispensed from the smaller opening of the funnel.

3. A device for producing a root rope from plant root material, the device comprising:
    a conveyor defining a transport path for transporting root material therealong;
    a carrier line suspended above said transport path and for receiving root material thereupon;
    a rotating drum comprising a funnel adapted to receive the carrier line and at least one wrapping material, the funnel comprising a first opening and a second opening, the first opening having a larger diameter than the second opening, wherein the carrier line, root material, and at least one wrapping material are received into the large opening of the funnel, the wrapping material being wound about the carrier line and root material by the rotating action of the rotating drum and the corresponding rotation of the funnel, thereby securing the root material to the carrier line to produce a root rope, the root rope being dispensed from the smaller opening of the funnel;
    a reel positioned to receive the completed root rope, the reel rotating to wrap the root rope around a surface thereof; and
    at least one pulley in communication with an exit of said funnel and disposed between the funnel and the reel, the at least one pulley adapted to receive the completed root rope from the funnel, the at least one pulley also in electronic communication with a controller adapted to regulate the speed of rotation of the reel.

* * * * *